United States Patent
Luo et al.

(10) Patent No.: US 6,705,563 B2
(45) Date of Patent: Mar. 16, 2004

(54) OPEN SHIPYARD WIRE FEEDER

(75) Inventors: Lifeng Luo, Solon, OH (US); Ronald J. Sears, Worthington, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 10/117,936

(22) Filed: Apr. 4, 2002

(65) Prior Publication Data

US 2003/0098383 A1 May 29, 2003

Related U.S. Application Data

(60) Provisional application No. 60/333,366, filed on Nov. 26, 2001.

(51) Int. Cl.[7] .......................... B65H 16/02; B23K 9/10; B62D 33/08; B62D 7/02
(52) U.S. Cl. .................... 242/557; 242/564.4; 242/599; 242/598.1; 218/137.2; 218/137.71; 280/43.11; 280/47.16; 280/47.19; 280/47.2
(58) Field of Search .............................. 242/557, 564.3, 242/564.4, 559, 588.1, 598.1; 219/137.2, 137.7, 137.71; D15/144; 280/47.17, 47.19, 47.16, 47.2, 43.11; 226/176

(56) References Cited

U.S. PATENT DOCUMENTS

| | | | | |
|---|---|---|---|---|
| 2,767,302 A | * | 10/1956 | Brashear, Jr. | 219/137.51 |
| 2,778,910 A | * | 1/1957 | Landis et al. | 219/137.31 |
| 3,016,451 A | * | 1/1962 | Cornell, Jr. | 219/137.44 |
| 3,217,136 A | * | 11/1965 | Anderson | 219/137.2 |
| 3,239,120 A | * | 3/1966 | Bosteels | 219/137.7 |
| 3,263,060 A | * | 7/1966 | Bosteels | 219/137.7 |
| 3,430,832 A | * | 3/1969 | Meyer | 226/174 |
| 4,508,954 A | | 4/1985 | Kroll | |
| 4,659,904 A | * | 4/1987 | Greineder | 219/130.21 |
| 4,665,300 A | | 5/1987 | Bellefleur | |
| 5,410,126 A | | 4/1995 | Miller et al. | |
| 5,836,539 A | | 11/1998 | Grimm et al. | |
| 6,213,375 B1 | | 4/2001 | Rybicki | |
| 6,225,596 B1 | | 5/2001 | Chandler et al. | |
| 6,561,528 B2 | * | 5/2003 | Bootsman | 280/47.19 |
| 6,568,578 B1 | * | 5/2003 | Kensrue | 219/137.7 |

FOREIGN PATENT DOCUMENTS

JP  5-285658 A  * 11/1993 ............... 219/137.7

* cited by examiner

Primary Examiner—Michael R. Mansen
(74) Attorney, Agent, or Firm—Fay, Sharpe, Fagan, Minnich & McKee

(57) ABSTRACT

An open shipyard feeder for supplying a consumable welding wire on a wire spool to a welding gun. The feeder includes a frame having a base extending in a longitudinal direction between a forward end and a rearward end and which supports the feeder on an underlying surface. The frame further includes a spool support means connected to the frame near the rearward end and which rotatably retains the wire spool relative to the frame allowing the spool to rotate about a spool axis. The feeder includes a wire advancing mechanism mounted on the frame for paying wire from the spool on the spool support to the welding gun. The feeder further includes a control box on the frame near the forward end. The feeder frame is rigid yet light weight and can support the wire feeder on a wide range of underlying surfaces while still being easily transportable.

77 Claims, 10 Drawing Sheets

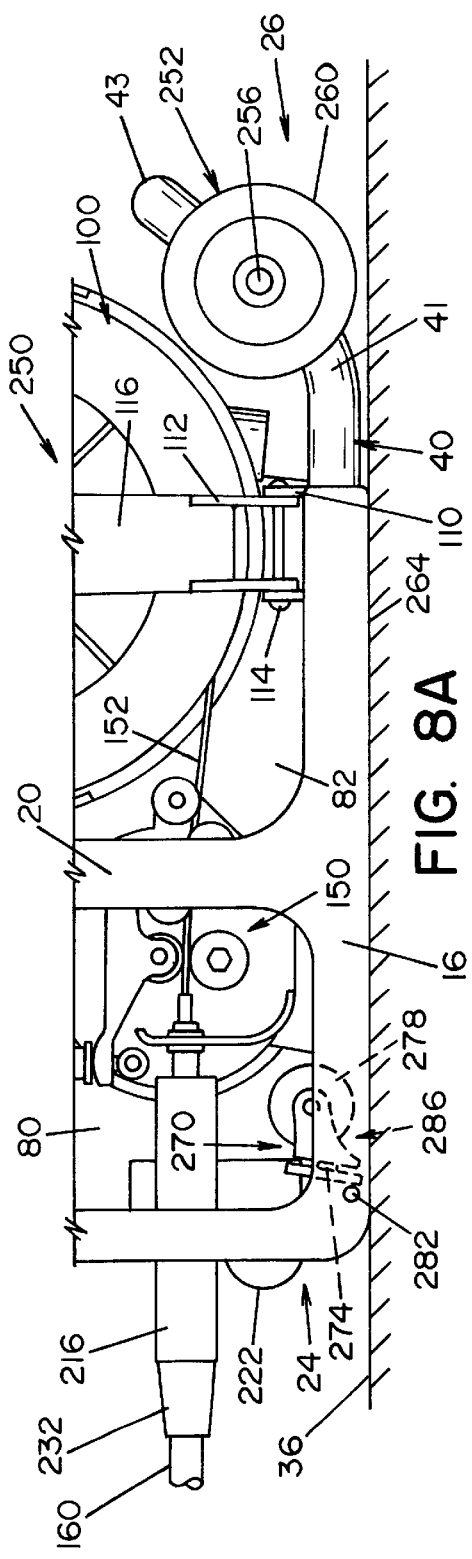
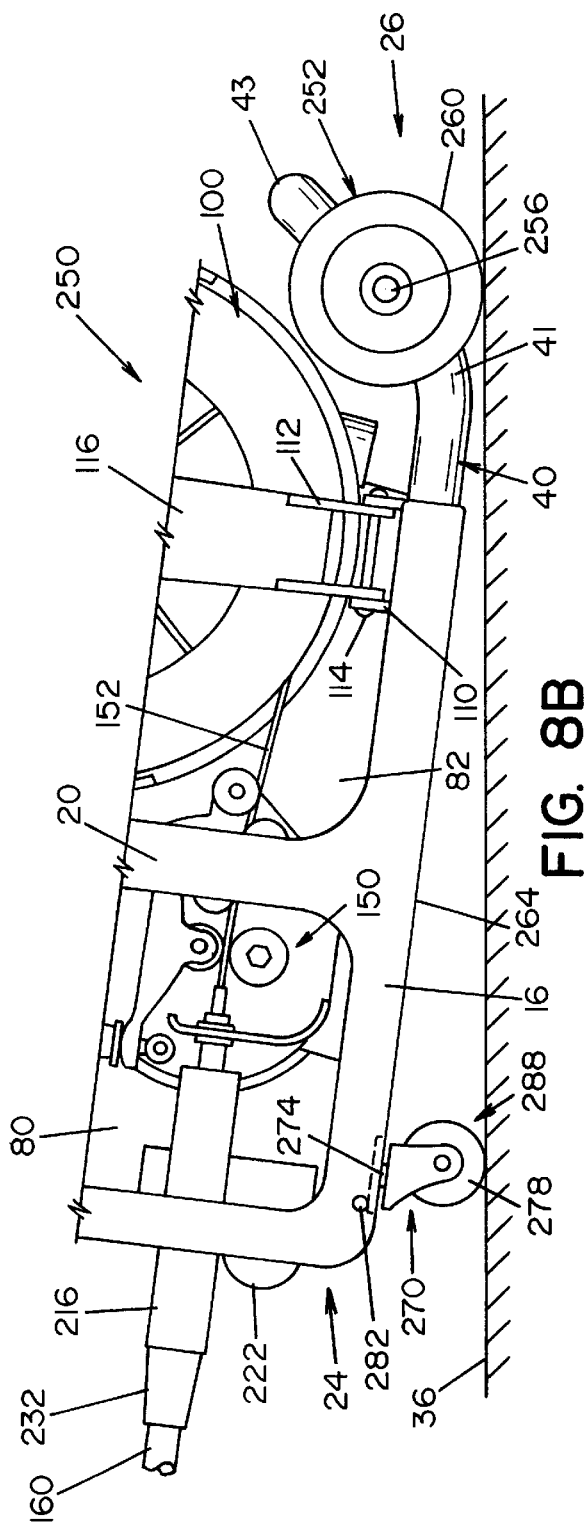

OPEN SHIPYARD WIRE FEEDER

The present invention is directed to a portable wire feeder and more particularly to an open shipyard style wire feeder. This application claims priority under 35 U.S.C. §119 to U.S. Provisional Application No. 60/333,366 filed Nov. 26, 2001.

INCORPORATION BY REFERENCE

The present invention relates to supplying a consumable welding wire electrode to the welding gun used in a welding operation wherein the location of the welding operation does not remain constant. This can include welding operations at job sites which change day to day or welding operations covering large areas at a single job site. Portable wire feeders are known in the art and are generally shown in Bellefleur U.S. Pat. No. 4,665,300; Rybicki U.S. Pat. No. 6,213,375; Kroll U.S. Pat. No. 4,508,954; Chandler U.S. Pat. No. 6,225,596; Miller U.S. Pat. No. 5,410,126 and Grimm U.S. Pat. No. 5,836,539. These patent are incorporated by reference herein as background information illustrating portable wire feeders.

BACKGROUND OF THE INVENTION

The present invention is particularly applicable for use in connection with shipyard welding and, therefore, the invention will be shown and described with particular reference thereto. However, the invention has much broader application in that it can be used as a portable wire feeder for many applications involving different types of job sites and welding operations.

It is, of course, well known that wire can be used as an effective welding consumable. Welding wire forms a part of the welding electrode and contributes to the weld pool as filler material. Therefore, the wire feeder needs to supply the welding operation with the welding wire in a consistent and controllable manner. Furthermore, in order to maximize the benefits of utilizing welding wire, the wire must be accurately directed to the weld point of the welding operation at a controlled rate.

The portable wire feeder must supply the welding operation with the welding wire in a consistent and controllable manner like a standard stationary wire feeder even though it must be capable of repeated movement and use in connection with a wide range of work environments, many of which can be severe. Therefore, the portable wire feeder must not only provide accurate and continuous wire control, it must have additional characteristics not found in stationary wire feeders that are used in controlled environments such as a work shop or factory floor. One such characteristic is that the portable wire feeder must be compact and light weight. Since the portable wire feeder is repeatedly moved, it is advantageous for the portable wire feeder to be lightweight. Furthermore, since on site jobs require the user to haul their tools in a fixed and many times limited space, a compact size is advantageous.

The portable wire feeder must be rugged. While the traditional wire feeder is typically used in one location over a long period of time, the portable wire feeder is constantly moved and subjected to many adverse conditions. Merely moving the portable wire feeder subjects it to impact forces by the underlying surface when it is placed on the surface and when it is transported in a work vehicle. Furthermore, each time the portable wire feeder is moved, there is a risk that the feeder will be dropped or impacted by other objects. Finally, the portable wire feeder is often used in harsh work environments.

The portable wire feeder must be easy to use even when the user is wearing protective gear. The user of a welder typically wears, among other protective gear, gloves and face/eye protection. Therefore the portable wire feeder should be easy to grasp and manipulate even with protective gloves. This includes the ability to easily manipulate the portable feeder over uncertain terrain often associated with many job sites and easily load the feeder onto a work vehicle. Furthermore, due to the uncertainty relating to the underlying surfaces, the portable wire feeder must be stable over a wide range of surfaces. This is especially important since the portable wire feeder is often pulled across the underlying surface by its wire guide tube. The controls must also be easily accessible and controllable by the user wearing protective gear and must be rugged.

The supply of welding wire needs to be easily replaceable under a wide range of conditions and protected against the elements of a harsh work environment. These characteristics often conflict. In this respect, providing protection for the welding wire typically involves a barrier between the wire and the environment. This can prevent easy accessability to and replacement of the welding wire. It is also advantageous to utilize a standard spool of welding wire in order to reduce cost and simplify wire replacement. This can increase the size of the portable wire feeder. Furthermore, providing easy access to an internal wire spool compartment can weaken the overall rigidity of the portable wire feeder.

Prior art wire feeders and portable wire feeders do not include these characteristics. In this respect, referring to the Chandler patent, a portable welding unit is disclosed which includes a wire feeder. While Chandler's device is compact, it does not provide protection for all of the components of the wire feeder. As a result, these components can be damaged during use or during the transportation of the feeder to and from the job site. Furthermore, the Chandler device is not easily stored or manipulated over non-flat underlying surfaces due to its narrow base design. The wire feeder disclosed in Bellefleur also is compact. However, Bellefleur's wire feeder is not easily transportable and it does not provide protection for the controls. Bellefleur also fails to disclose a rigid frame to prevent impact damage. The Miller patent discloses a portable wire feeder which also fails to provide protection for the controls. In fact, the Miller controls are on an outside edge without protection. Furthermore, Miller's feeder does not include any means for easy movement or manipulation. Another disadvantage associated with the Miller device is that access to the wire supply is restricted.

SUMMARY OF THE INVENTION

In accordance with the present invention, provided is a portable wire feeder is provided for use in connection with shipyard welding operations which includes a frame structure that supports the portable wire feeder on a wide variety of underlying surfaces and protects the internal components from impact while allowing easy access to the internal components, and easy transportation and use of the portable wire feeder. In this respect, a portable wire feeder in accordance with the present invention includes a lightweight yet rigid outer frame structure that is configured for stability. The outer frame further includes accessible grasp points and selectively engageable covers for protecting the internal components while providing easy access thereto.

The outer frame of a wire feeder according to the present invention defines a rigid outer perimeter. The frame includes a non-parallel base rail structure wherein the base rails are spaced apart and extend away from one another near the rearward end of the frame such that the base is widest at its rearward end. Since the rearward end is also the heaviest portion of the portable wire feeder, the weight of the feeder is concentrated over the widest portion making the structure more stable. Furthermore, this configuration also minimizes tipping when the feeder is on uneven surfaces or when it's pulled by the wire guide tube that extends out its forward end. The frame further includes sides which extend upwardly and toward one another. This configuration lowers the center of gravity which further increases the stability of the portable wire feeder. In addition, the frame includes front and back portions that protect the internal components and which include access openings for certain internal components. The frame further includes handles for moving and transporting the portable wire feeder with either one or two hands.

In accordance with another aspect of the present invention, the portable wire feeder includes multiple covers for selectively covering the control box and the wire spool. Both covers are configured to be easily opened and closed even with a gloved hand. Furthermore, these covers can include transparent panels to allow the user to monitor the control box and spool while welding. The control box includes gauges and/or controls for the wire feeder and/or the welding operation and which gauges and controls can be damaged from welding spatter or from impact by other objects. The control box cover is pivotal relative to the frame between an opened and a closed position wherein the gauges and/or controls are protected while in the closed position. Even though the control box and cover are positioned near a center handle for convenience of operation, both are sufficiently spaced from the center handle to allow the user to easily open or close the cover with a gloved hand even while the user supports the feeder by the center grasp handle. The wire spool cover also moves relative to the frame between an opened and a closed position. The spool cover provides protection similar to the protection provided by the box cover.

In accordance with even another aspect of the present invention, the portable wire feeder includes a spool support that is easily accessible without weakening the frame and without complicating the replacement of the wire spool. In fact, the spool support according to the present invention actually strengthens the frame structure of the portable wire feeder. As stated above, the welding wire is consumable and, therefore, the wire spool must be replaced as the wire is depleted or when the type of wire is changed. The spool support must therefore include a spindle with at least one free end that can receive the wire spool. The spindle according to the present invention has a first end rigidly connected to the frame and a second end which is free to receiving the wire spool. However, the second end includes a latch mechanism that can interengaged with a pivotal frame component such that both ends of the spindle are supported on the frame when latched, and the spindle acts as an additional frame component. The spool support is preferably positioned near the rearward end for increased stability and to prevent the wire spool or support from blocking access to the control box.

In accordance with yet another aspect of the present invention, the portable wire feeder includes multiple handles spaced on either side of the center of gravity of the portable wire feeder. This allows for two handed and balanced lifting which makes the feeder easier to transport. More particularly, the two handles are spaced from one another on either side of the heavy wire spool. One handle is positioned between the rearward end and the spool axis and the other handle is more centered and is between the forward end of the feeder and the spool axis. The center handle is also closer to the actual center of gravity so that the user can use his/her free hand for other purposes such as to operate the controls. In addition, the handles are also structural components of the frame to further strengthen the frame without adding unnecessary weight.

In accordance with a further aspect of the present invention, the portable wire feeder further include wheels which can engage an underlying surface to allow the feeder to freely roll on the surface. Since easy movement is not always advantageous, the wheels can be designed for varying degrees of movement of the feeder. The first configuration allows for continuous wheel engagement which allows the feeder to freely move on flat surfaces at all times. A second configuration allows for the wheels to engage the underlying surface only when the front of the feeder is raised. This configuration allows for easy movement only when desired without modification to the wheels. The third configuration is a combination of the first two. With respect to the second configuration, the frame includes an upwardly extending portion which supports the wheel axles such that the axles to are spaced sufficiently above the bottom of the base so the wheels do not engage the underlying surface when the base is resting flat on the surface. Engagement by the wheels is initiated only when the forward end of the feeder is lifted upwardly relative to the rearward end. This allows the user to decide when the portable wire feeder is to be free to roll on the underlying surface and when it is to be stationary. In the third configuration, front casters are provided which are pivotably connected to the forward end of the base for movement about a horizontal caster axis between an operating position and a retracted position. When the casters are in the retracted position they are spaced from the underlying surface when the bottom of the feeder is resting on the surface. However, when the casters are in the operating position, the bottom of the feeder is spaced from the underlying surface and the casters engage the surface similar to the first configuration. This allows the user to quickly adapt the feeder between a highly mobile feeder and a stationary feeder.

In accordance with even another aspect of the present invention, the portable wire feeder includes a control box that can be removed from the feeder. This provision allows the portable wire feeder to be operated remotely thereby preventing the user from having to return to the feeder to make an adjustment during the welding operation.

The primary object of the present invention is the provision of a portable wire feeder which is light weight yet rigid so that it can be easily transported and withstand many adverse conditions.

Another object is the provision of a portable wire feeder of the foregoing character which is easy to maneuver yet is capable of being maintained in a set position.

Still another object is the provision of a portable wire feeder of the foregoing character which includes at least two handles spaced on either side of the center of gravity for the portable wire feeder.

A further object is the provision of a portable wire feeder of the foregoing character wherein one of the handles is near the center of gravity for the portable wire feeder so that one hand can be used to support the feeder while the other hand can operate controls on the feeder.

Yet a further object is the provision of a portable wire feeder of the foregoing character which includes a spool support for a wire spool that allows full and easy access to the wire spool while also acting as a structural component of the frame when latched.

Still another object is the provision of a portable wire feeder of the foregoing character which includes wheels that are selectively engageable with an underlying surface.

Still another object is the provision of a portable wire feeder of the foregoing character wherein the wheels are attached to fixed axles that are spaced above the base of the frame such that the wheels only engage the underlying surface when its forward end is lifted relative to the rearward end.

Yet a further object is the provision of a portable wire feeder of the foregoing character which includes casters on the forward end of the base which are retractable such that they pivot between an operating position wherein the casters and the wheels engage the underlying surface and a retracted position where the caster and the wheels are spaced from the underlying surface as the bottom of the frame rests on the surface.

A further object is the provision of a portable feeder of the foregoing character which includes a control box cover which is pivotal between an open and a closed position wherein the user can grasp the handle nearest the control box in one hand and operate the box cover and the controls with the other hand.

Yet another object of the present invention is the provision of a portable wire feeder of the foregoing character which includes a retractable spool cover which protects the wire spool and which can be quickly retracted to gain access to the wire spool.

Another object of the present invention is the provision of a portable feeder of the foregoing character which includes a base that is wider near its rearward end thereby making the portable wire feeder more stable.

Yet a further object is the provision of a portable wire feeder of the foregoing character wherein the center of gravity of the portable wire feeder is set low and near the rearward end near the widest portion of the base making the portable wire feeder stable on a wide variety of surfaces.

Even a further object is the provision of a portable wire feeder of the foregoing character which includes a control box that is removable from the portable wire feeder allowing the user to control the wire feeding and/or the welding operation from a remote location.

Another object is the provision of a portable wire feeder of the foregoing character which utilizes components that are economical to manufacture, easy to use in the field while still being light weight and durable.

BRIEF DESCRIPTION OF THE DRAWINGS

The foregoing objects, and others, will in part be obvious and in part be pointed out more fully hereinafter in connection with a written description of preferred embodiments of the present invention illustrated in the accompanying drawings in which:

FIG. 8A is a partial side elevational view of yet another embodiment of a portable wire feeder in accordance with the present invention which includes casters shown in a retracted position;

FIG. 8B is a partial side elevational view of the portable wire feeder shown in FIG. 8A wherein the casters are shown in an operating position;

DESCRIPTION OF PREFERRED EMBODIMENTS

Figure 1:
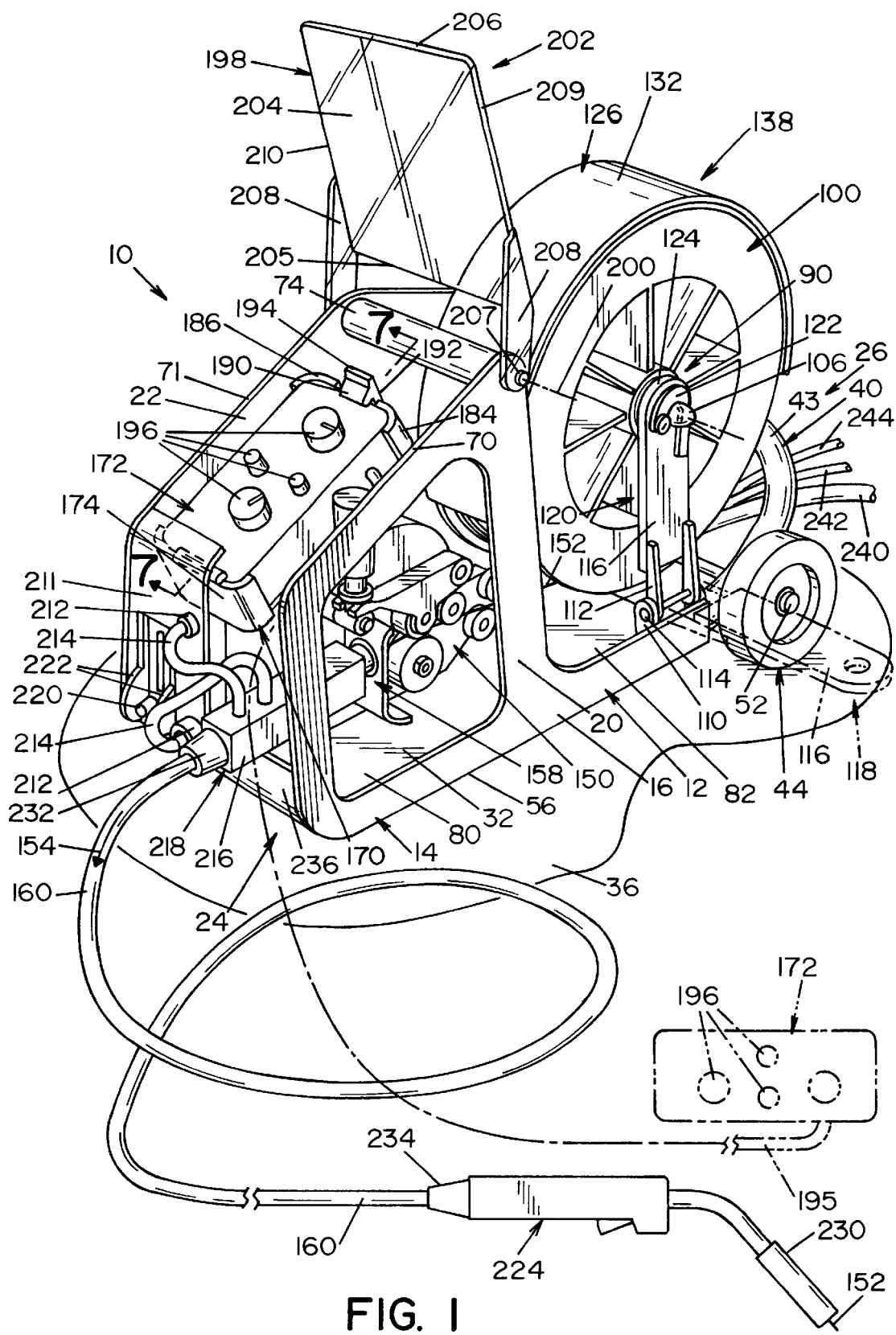
FIG. 1 is a perspective view of a portable wire feeder in accordance with the present invention wherein the box cover is in the opened position, the spool cover is in the closed position and the locking arm of the spool support is shown in both the opened and latched conditions.
Figure 2:
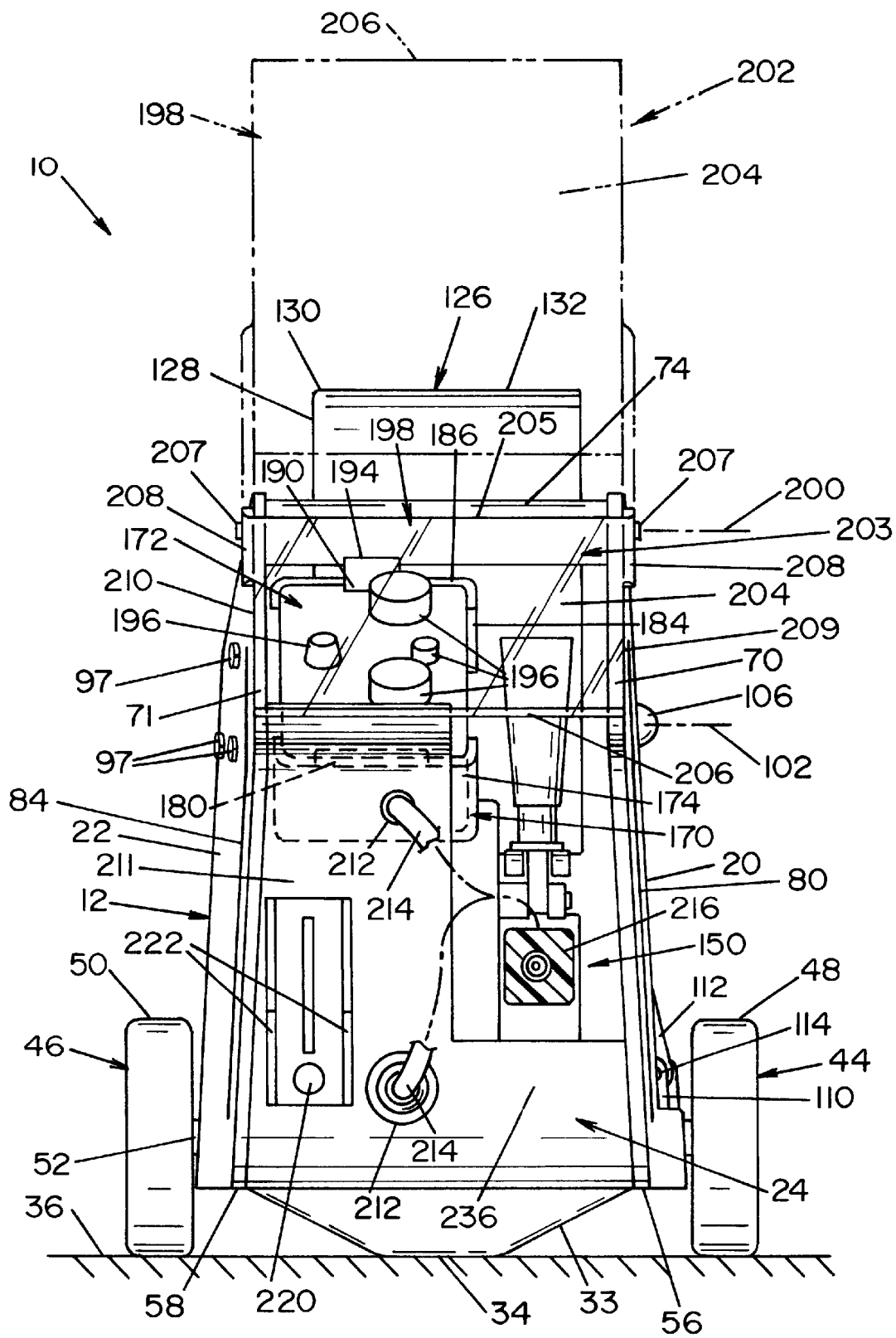
FIG. 2 is a front elevational view of the portable wire feeder shown in FIG. 1 wherein the box cover is shown in both the opened and closed positions.
Figure 3:
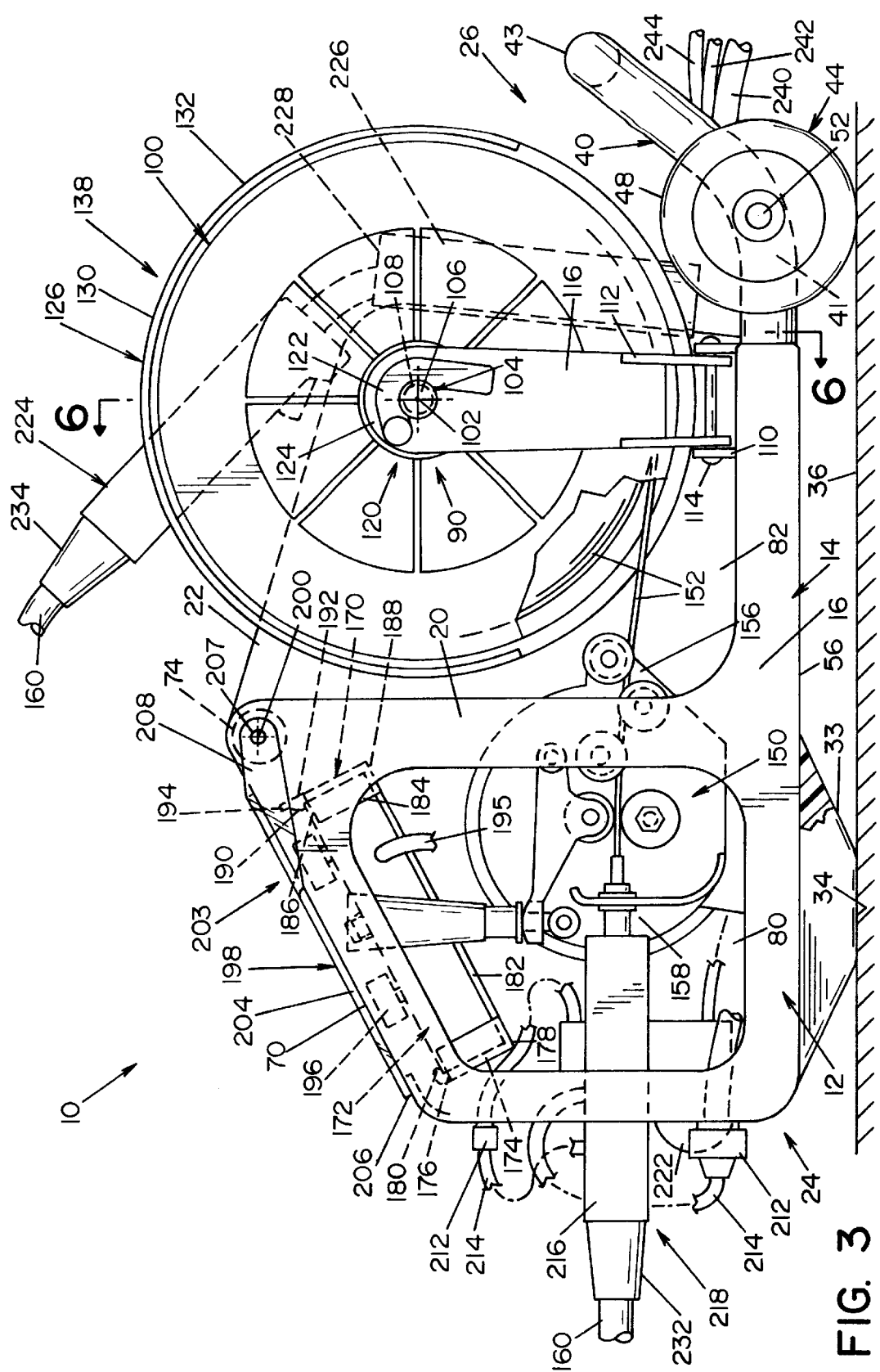
FIG. 3 is a side elevational view looking from right to left in FIG. 2 and wherein the box cover is shown in the closed position.
Figure 4:
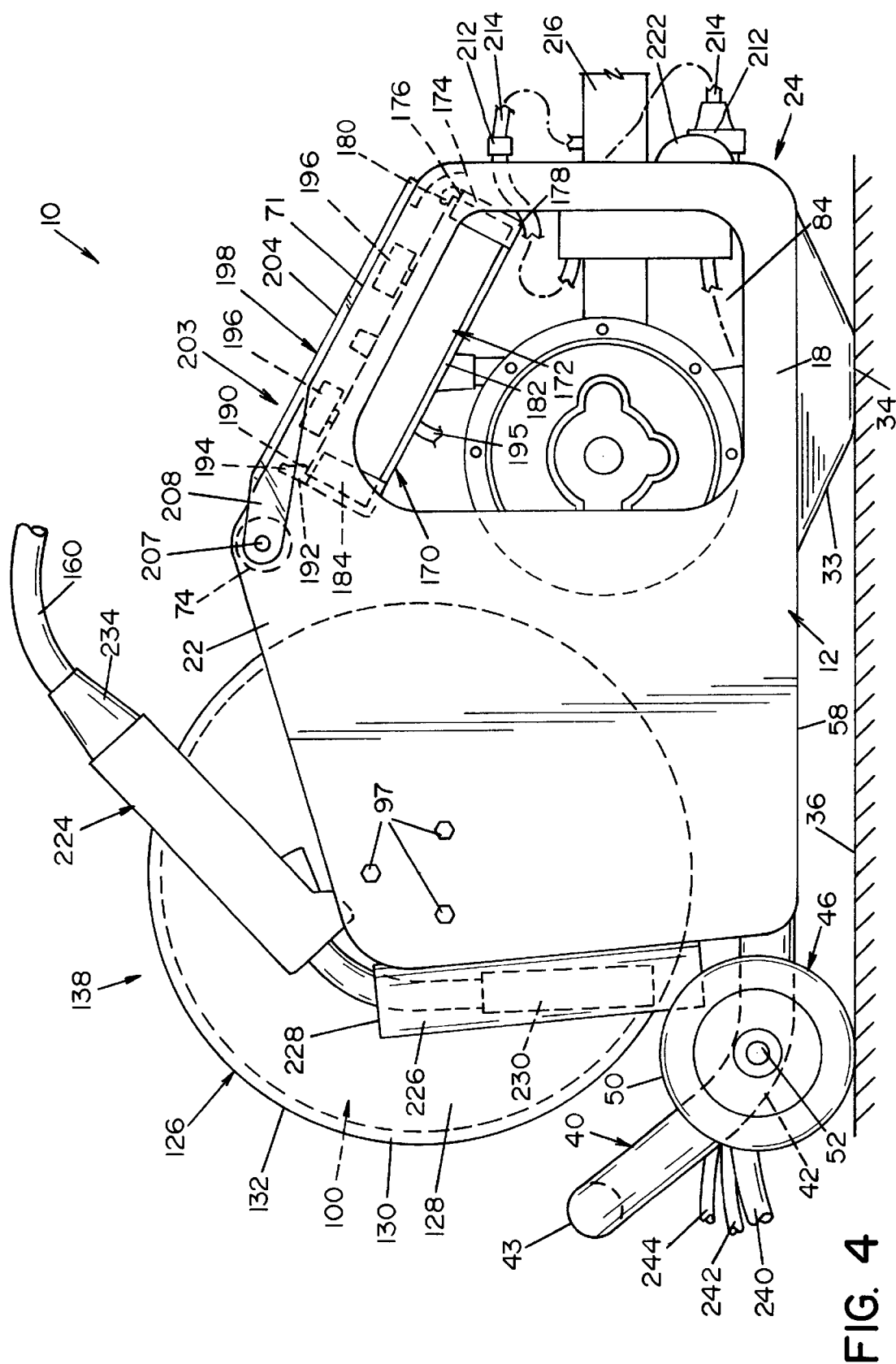
FIG. 4 is a side elevational view of the other side of the portable wire feeder and wherein the box cover is shown in the closed position.
Figure 5:
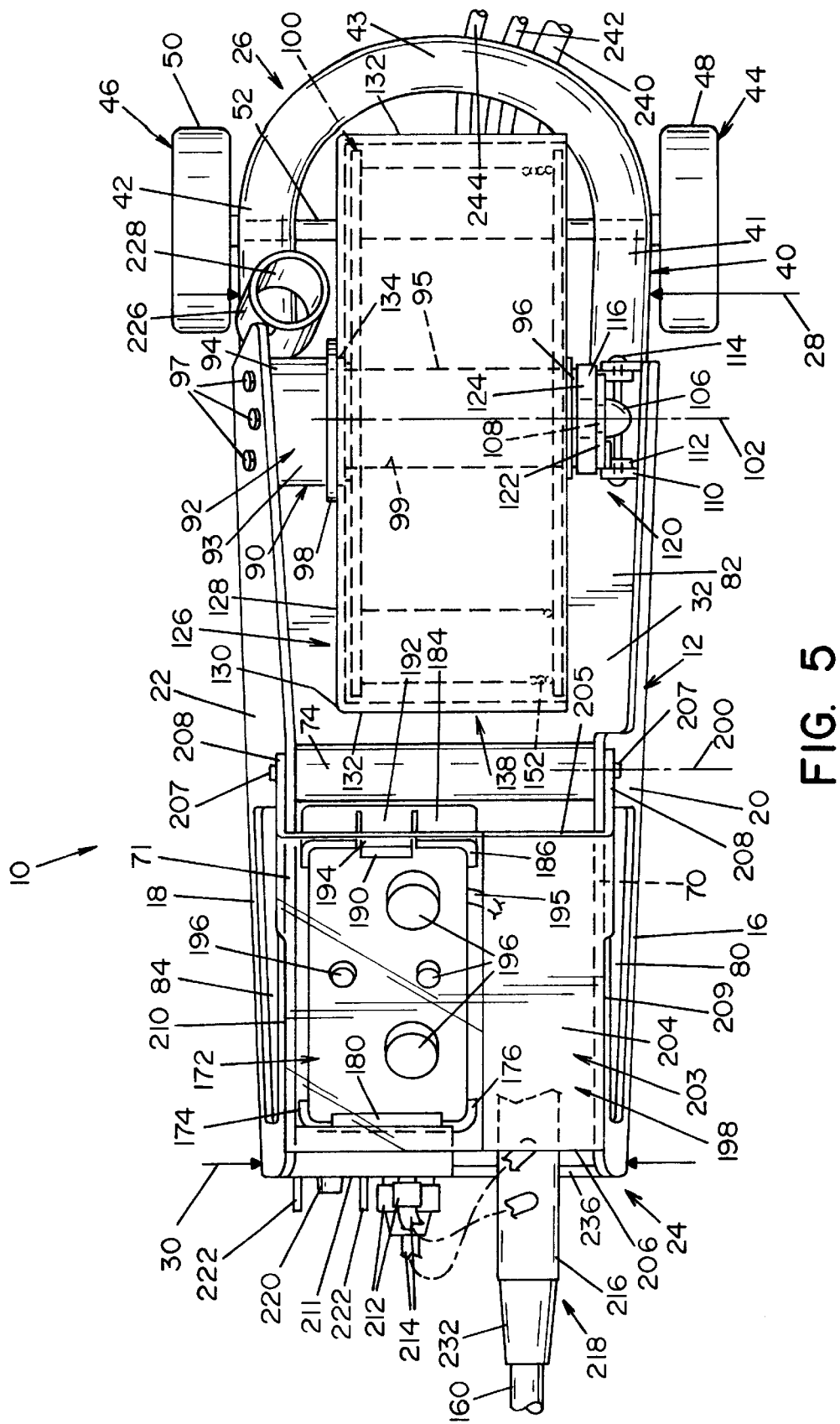
FIG. 5 is a top view of the portable wire feeder shown in FIG. 1 wherein the box cover is in the closed position.
Figure 6:
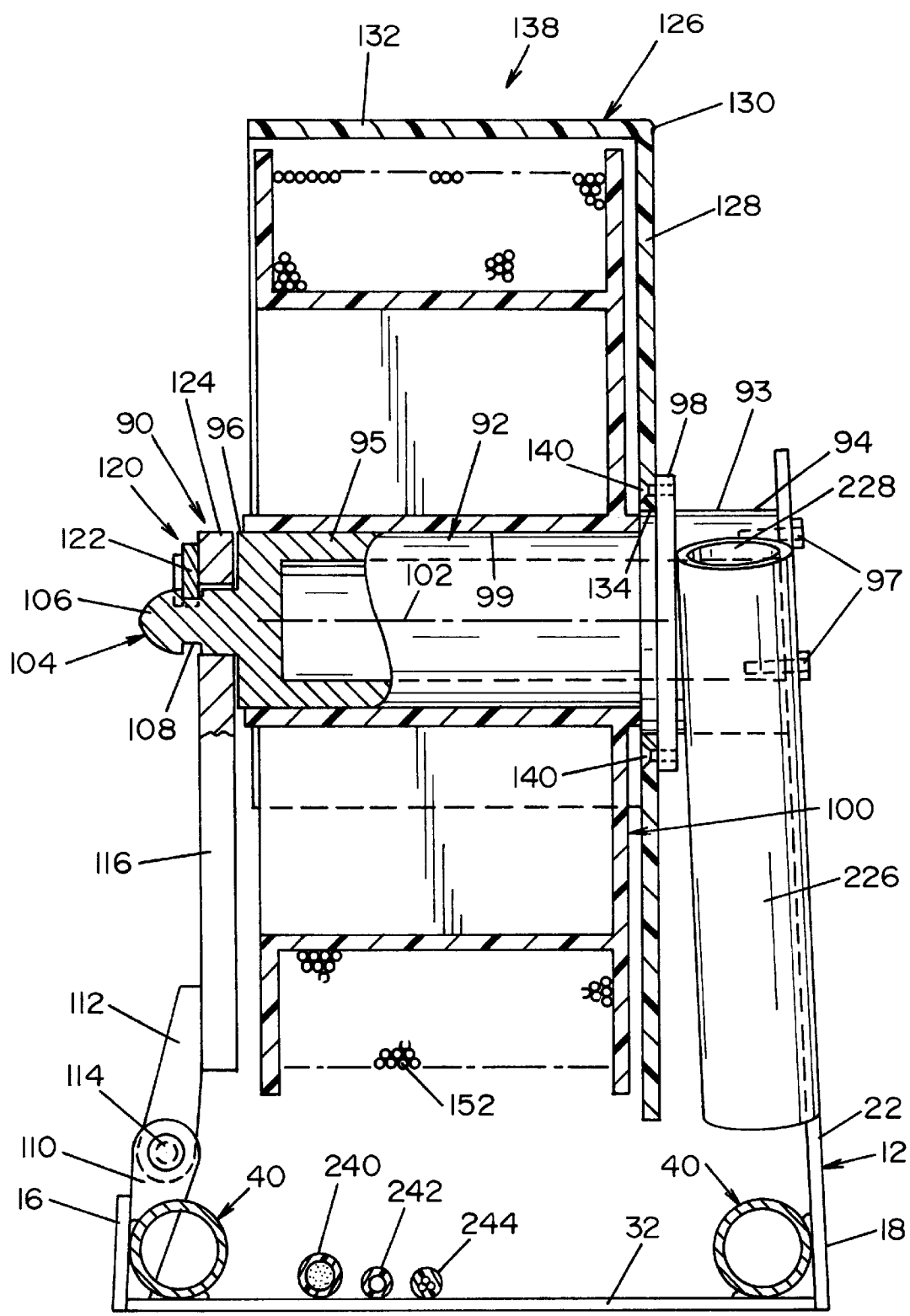
FIG. 6 is a sectional elevational view of the portable wire feeder taken along line 6—6 in FIG. 3.
Figure 7:
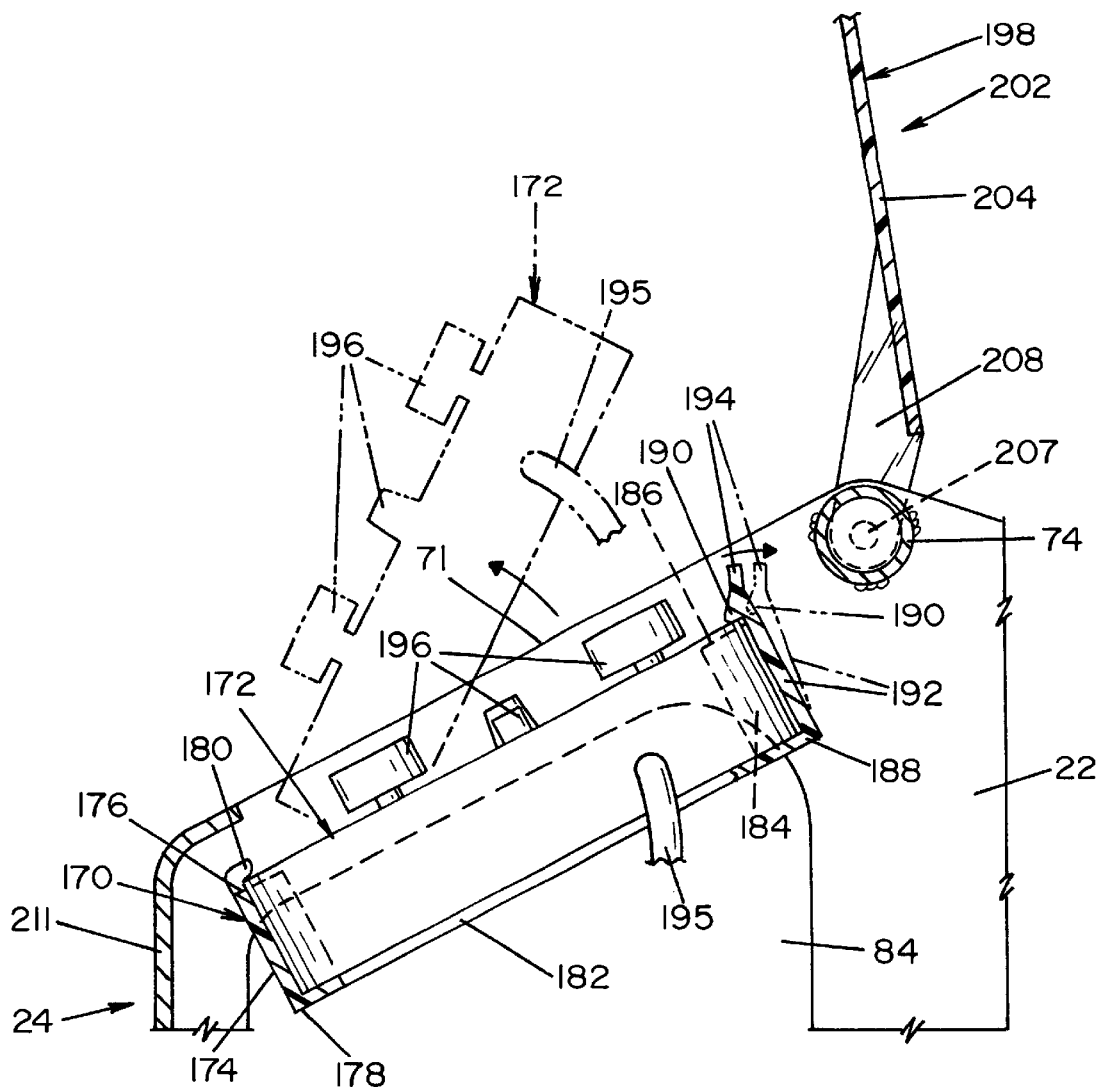
FIG. 7 is a sectional view of the control box and cover taken along line 7—7 in FIG. 1.

Referring now in greater detail to the drawings wherein the showings are for the purpose of illustrating preferred embodiments of the invention only, and not for the purpose of limiting the invention, FIGS. 1–7 illustrate an open shipyard or portable wire feeder 10 which includes a frame 12 that can come in many forms without departing from the invention herein. Frame 12 is a compilation of several structural elements that can be either sheet steel or tubular members. Portable wire feeder 10 is shown in its preferred configuration wherein it includes a base 14 comprised of side rails 16 and 18 that are a unified component with sides 20 and 22 respectively. However, it should be noted that side rails 16 and 18 which will be discussed hereinafter could be formed by a separate member including tubular members. Side rails 16 and 18 extend between a forward end 24 and rearward end 26 in a longitudinal direction of feeder 10. However, side rails 16 and 18 are nonparallel and extend away from each other toward the rearward direction such that base 14 has a rear width between arrows 28 which is greater than the front width between arrows 30. More particularly, it is preferred that the rear width is approximately 3.5 inches wider than the front width. Base 14 further includes a bottom panel 32 which extends in the longitudinal direction generally between the forward and rearward ends 24 and 26 respectively and between side rails 16 and 18. Bottom panel 32 includes a downwardly extending base portion 33 adjacent the forward end thereof and having a bottom surface 34 for engaging an underlying surface 36.

Frame 12 further includes a back member 40 that extends between rails 16 and 18. Back member 40 extends horizontally from base 14 and includes upward bends 41 and 42. Member 40 is shown as a tubular member extending rearwardly and upwardly from the rearward end of base 14 and including a handle 43. However, back member can take many forms including two independent extensions that are separate from handle 43. Wheels 44 and 46 include wheel surfaces 48 and 50 respectively for engaging underlying surface 36 and are secured to back member 40 by an axle 52 which could be two independent axles. Axle 52 is positioned on back member 40 such that wheel surfaces 48 and 50 respectively extending below the bottom edges 56 and 58 of side rails 16 and 18 respectively. Essentially, wheel surfaces 48 and 50 extend below bottom edges 56 and 58 the same distance as bottom surface 34 and, therefore, portable wire feeder 10 engages underlying surface 36 at three points, namely, bottom surface 34, wheel surface 48 and wheel surface 50. As a result, when feeder 10 is at rest on underlying surface 36, it will remain at a set point. However, if the user lifts forward end 24, feeder 10 can be easily rolled on surface 36. While bottom surface 34 is shown to be flat, it could be arcuate so that only a portion of the surface contacts underlying surfaces 36.

Sides 20 and 22 extend upwardly from side rails 16 and 18 respectively and also extend toward one another such that the top edges 70 and 71 are closer to one another than bottom edges 56 and 58. This lowers the center of gravity of feeder 10 making it even more stable. It is preferred that the top edges 70 and 71 are approximately 2 inches closer together than bottom edges 56 and 58. Top edges 70 and 71 are joined by a center handle 74 which acts as both a grasp point for the user and a structural component of frame 12. Furthermore, the compound angle formed by the sides extending toward one another and the front of the base being narrower than the back of the base makes edges 70 and 71 parallel to one another which will be discussed below in greater detail. Side 20 further includes side openings 80 and 82 and side 22 further includes side opening 84 which will also be discussed in greater detail below.

Feeder 10 further includes a spool support 90 having a spindle 92 having a base portion 93 at a first end 94 and a cylindrical portion 95 extending toward a second end 96. Base portion 93 is connected to side 22 by fasteners 97 and includes a stop flange 98. While fasteners 97 are shown, other means such as welding, can be used to secure spindle 92 to side 22. Cylindrical portion 95 is shaped to receive a central opening 99 of a wire spool 100 allowing spool 100 to freely rotate about a spool axis 102. It should be noted that while no rotation restriction device or brake is shown in connection with the rotation of wire spool 100, any such mechanism known in the art could be used in connection with feeder 10 without departing from the present invention. Spindle 92 further includes a first latch component 104 at second end 96 which includes a tapered nose 106 and a locking groove 108. Support 90 further includes frame bracket 110 secured to frame 12 and pivot bracket 112 pivotally connected to frame bracket 110 by a pivot pin 114. Locking arm 116 is secured to pivot bracket 112 and is adapted to pivot between an opened condition 118 and a latched condition 120, as shown in FIG. 1, and includes a second latch component 122 near end 124 of the locking arm. Second latch component 122 is rotatable relative to locking arm 116 for selectively engaging locking groove 108 to rigidly secure arm end 124 to spindle 92, thereby further supporting wire spool 100 and further stiffening frame 12. In essence, spindle 92 acts as an additional structural component of frame 12 when in the latched condition. However, when latch component 122 is released from locking groove 108, locking arm 116 is allowed to freely rotate about pivot pin 114 to the open condition 118. While only one type of latch is discussed, it should be noted that other latches known in the art can be used to rigidly secure locking arm 116 to spindle 92. When in the open condition 118, wire spool 100 can be easily and quickly removed from spindle 92 through side opening 82. Side opening 82 is shaped and sized to be large enough to accept the largest wire spool designed for use with feeder 10. Openings 80 and 84 provide access to the wire advancing mechanism and the electrical connections which will be discussed below.

Support 90 further includes a spool cover 126 comprising a vertical side panel 128 having a peripheral edge 130 and an arcuate top panel 132 extending transversely across the wire reel from at least a portion of edge 130. Vertical panel 128 includes a central opening 134 shaped to receive spindle 92 allowing spool cover 126 to pivot about spool axis 102 between an opened position, not shown, and a closed position shown in FIG. 1. Vertical panel 128 of spool cover 126 is pivotally secured to flange 98 by fasteners 140. As a result, when the user replaces wire spool 100, spool cover 126 can be pivoted to the open position where it will not obstruct the users access to or view of spool 100. However, when spool cover is in closed position 138 it protects spool 100 and the wire supply from spatter and impact. In another embodiment, not shown, top panel 132 is transparent so that the user can monitor the wire supply.

Feeder 10 further includes a wire advancing mechanism 150 mounted to frame 12 near forward end 24. Mechanism 150 includes an inlet 156 shaped to receive welding wire 152 from wire spool 100 and a plurality of pinch rollers not designated numerically, to direct wire 152 toward outlet 158 and into wire guide tube 160 in an operating direction 154. Further details on mechanism 150 and wire straightening devices are not given in that they are known in the art and not part of the present invention.

Figure 10:
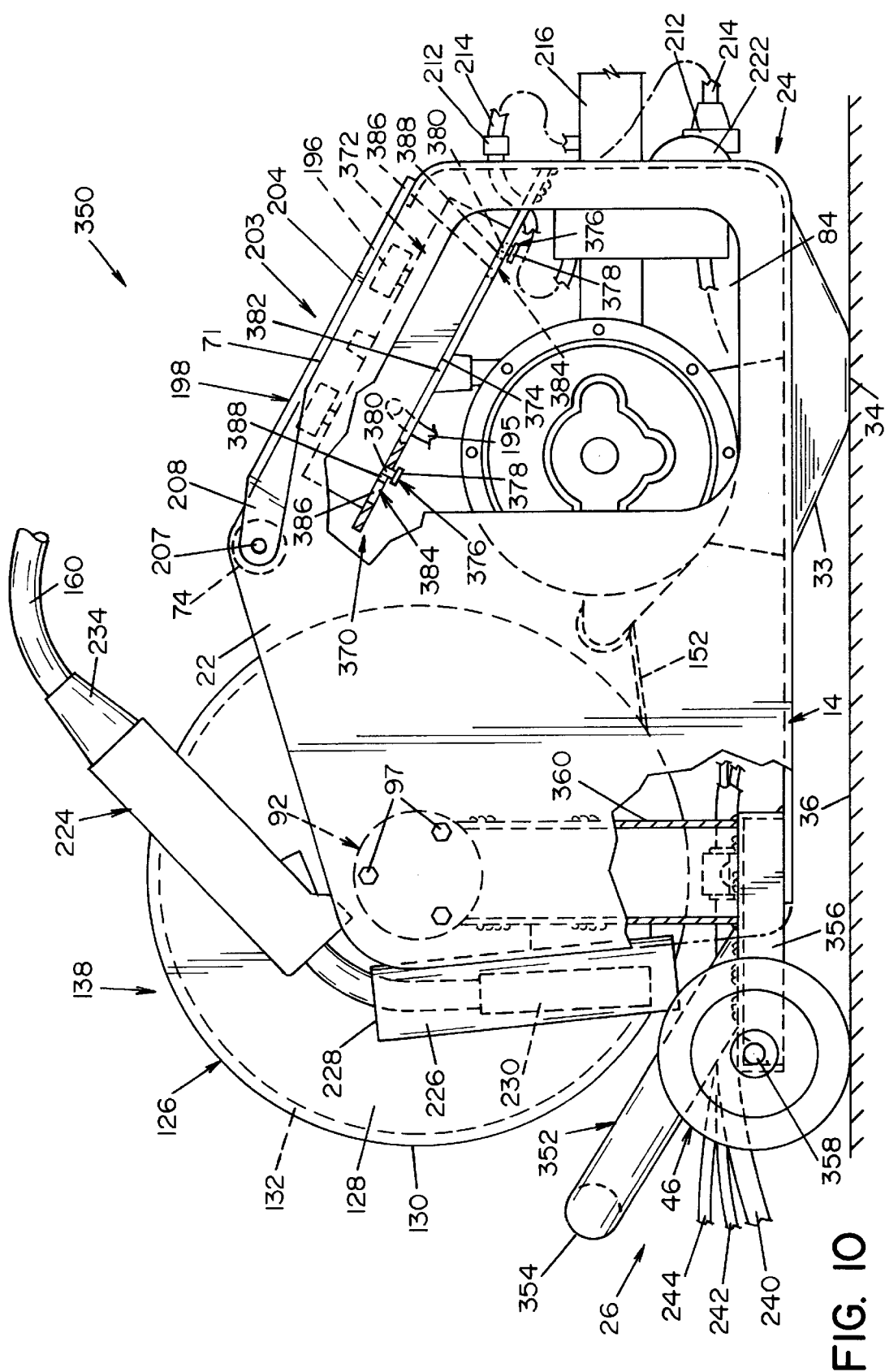

Feeder 10 further includes a control box holder 170 which selectively retains a pendant control box 172. Holder 170 includes a bottom retainer 174 having top and bottom edges 176 and 178 respectively. Top edge 176 has an inwardly facing lip 180 and bottom edge 178 is secured to a bottom plate 182. Box holder 170 further includes a top retainer 184 having top and bottom edges 186 and 188 respectively wherein bottom edge 188 is connected to the opposite end of bottom plate 182 opposite retainer 174. Bottom retainer 174, top retainer 184 and plate 182 are shaped to receive control box 172. Box 172 is selectively retained within box holder 170 by the interengagement with inwardly facing lip 180 and an inwardly facing edge 190 of a latch 192 that is biased towards control box 172 by a spring which is not shown. Latch 192 further includes a thumb extension 194 which allows the user to urge latch 192 away from control box 172 thereby releasing box 172 from holder 170. As a result, the control box can be removed from feeder 10 thereby providing the ability to control the wire feeder at a remote location. It should be noted that other types of selectively engageable mechanisms, such as is shown in FIG. 10, could be used to secure box 172 to feeder 10. Control box 172 is operatingly connected to the other mechanisms of the wire feeder by a control wire 195. Control box 172 can have one or more of the gauges and/or controls 196 utilized to control and maintain the wire feeder and/or the welding operation. The gauges and/or controls are those known in the art and, therefore, are not be discussed in detail herein.

A control box cover 198 provides protection for gauges and/or controls 196 from weld spatter or impact by other objects. Box cover 198 is pivotal about cover axis 200 relative to frame 12 between an opened position 202, shown in FIG. 1, and a closed position 203, shown in FIG. 4, and the gauges and/or controls are protected while the cover is in the closed position. Cover 198 includes cover plate 204 having a first edge 205, facing handle 74 and a second edge 206 opposite to first edge 205. Plate 204 is shown to be transparent so that gauges/controls 196 can be monitored even during use of feeder 10. In another embodiment, discussed below, cover plate 204 includes a transparent window portion over the gauges and/or controls. In even another embodiment, not shown, none of cover plate 204 is transparent. Cover 198 is connected by a pivot pin 207 and arms 208 to sides 20 and 22 which allows the cover to pivot between opened and closed positions 202 and 203, respectively, about axis 200. Since top edges 70 and 71 are parallel to one another and plate 204 is essentially rectangular, side edges 209 and 210 of cover plate 204 are parallel to edges 70 and 71 when in the closed position. Even though control box 172 is positioned near handle 74 and pivot pin 207 is centered in handle 74, edge 205 is sufficiently spaced from handle 74 to allow the user's hand to grasp handle 74 and pivot cover 198 simultaneously.

Feeder 10 further includes a front panel 211 on forward end 24 of the frame which further protects the feeder's internal components. Front panel 211 can include outlets 212 for power cables 214 which supply the electrical power necessary for the welding operation. Cables 214 are electrically connected to an electrode head 216 which extends forwardly from advancing mechanism outlet 158 and provides the electrical connection between the welding power supply and the welding operation. Head 216 is secured to feeder 10 and has an outlet 218 connected to wire guide tube 160. Since wire feeder 10 is often pulled by tube 160, the connection between tube 160 and head 216 includes strain relief 232 and the connection between welding gun and tube includes strain relief 234. Frame 12 further includes cross member 236 which acts as a forward handle for feeder 10.

Panel 211 further includes a power switch 220 that is protected by a pair of switch protectors 222 that extend forwardly of panel 211. With the power switch conveniently placed on an outer surface of feeder 10, switch protectors 222 provide protection against impact damage.

Wire guide tube 160 is attached to outlet 218 of head 216 on one end and on the other end to a welding gun 224. Guide tube 160 is sufficiently long enough to allow the user to freely move about a larger welding area while feeder 10 remains at a set point. Gun 224 can be conveniently stored in gun holder 226 that is secured to frame 12. Holder 226 is a tubular member having a top opening 228 for receiving gun tip 230. In order to provide a convenient and easily movable welding package, feeder 10 also includes power supply inlet 240, gas supply inlet 242 and electrical cord 244 extending rearwardly of base rearward end 26. Power supply 240, gas supply 242 and cord 244 are know in the art and are not be discussed in detail herein. However, power supply 240, gas supply 242 and cord 244 preferably extend out from rearward end 26 so they conveniently extend out the end opposite to wire guide tube 160 and control box 172. In addition cords 240, 242 and 244 can include strain reliefs which are not shown. The rear extending cords provide improved movement characteristics of feeder 10 and help keep the cords away from the welding operation and the spatter produced therefrom.

In the following discussions concerning other embodiments, the components of portable wire feeder 10 which remain the same, as discussed above, will include the same reference numbers as above.

Referring to FIGS. 8A and 8B, shown is a portable wire feeder 250 which includes a different wheel configuration. In this respect, feeder 250 does not include downwardly extending base portion 33 which provides the third point of contact for feeder 10 discussed above. Further, as will be appreciated from FIG. 5, feeder 250 includes a pair of wheels 252 which rotate about a wheel axle 256 that is secured to back member 40 such that wheel surfaces 260 of the wheels are spaced from underlying surface 36 when a bottom surface 264 engages underlying surface 36. On feeder 250, axle 256 is spaced further up back member 40 to provide the spacing between wheel surfaces 260 and underlying surface 36 when bottom 264 is resting on surface 36. Lifting forward end 24 engages wheel surfaces 260 against underlying surface 36. Feeder 250 further includes a pair of front casters 270 joined to side rails 16 and 18 near forward end 24. Each caster 270 is pivotal about a corresponding vertical stem 274 that works in connection with trailing wheels 278 to allow feeder 250 to be easily rolled on surface 36 in any direction. Casters 270 can also pivot about a corresponding horizontal caster axis 282 between a retracted position 286 and an operating position 288. When in the retracted position, wheels 278 are spaced above bottom surface 264 such that surface 264 engages underlying surface 36 and, as mentioned above, wheel surfaces 260 of wheels 252 are also spaced above underlying surface 36 when surface 264 engages the latter. When casters 270 are pivoted about their caster axis 282 into operating position 288, casters 270 engage underlying surface 36 and raise the forward end of feeder 250 sufficiently to bring wheel surfaces 260 of wheels 252 into engagement with surface 36. This provides for easy movement of feeder 250 on surface 36. Furthermore, this configuration allows feeder 250 to be maintained in a set position or to be easily moved based on the needs of the user.

Figure 9:
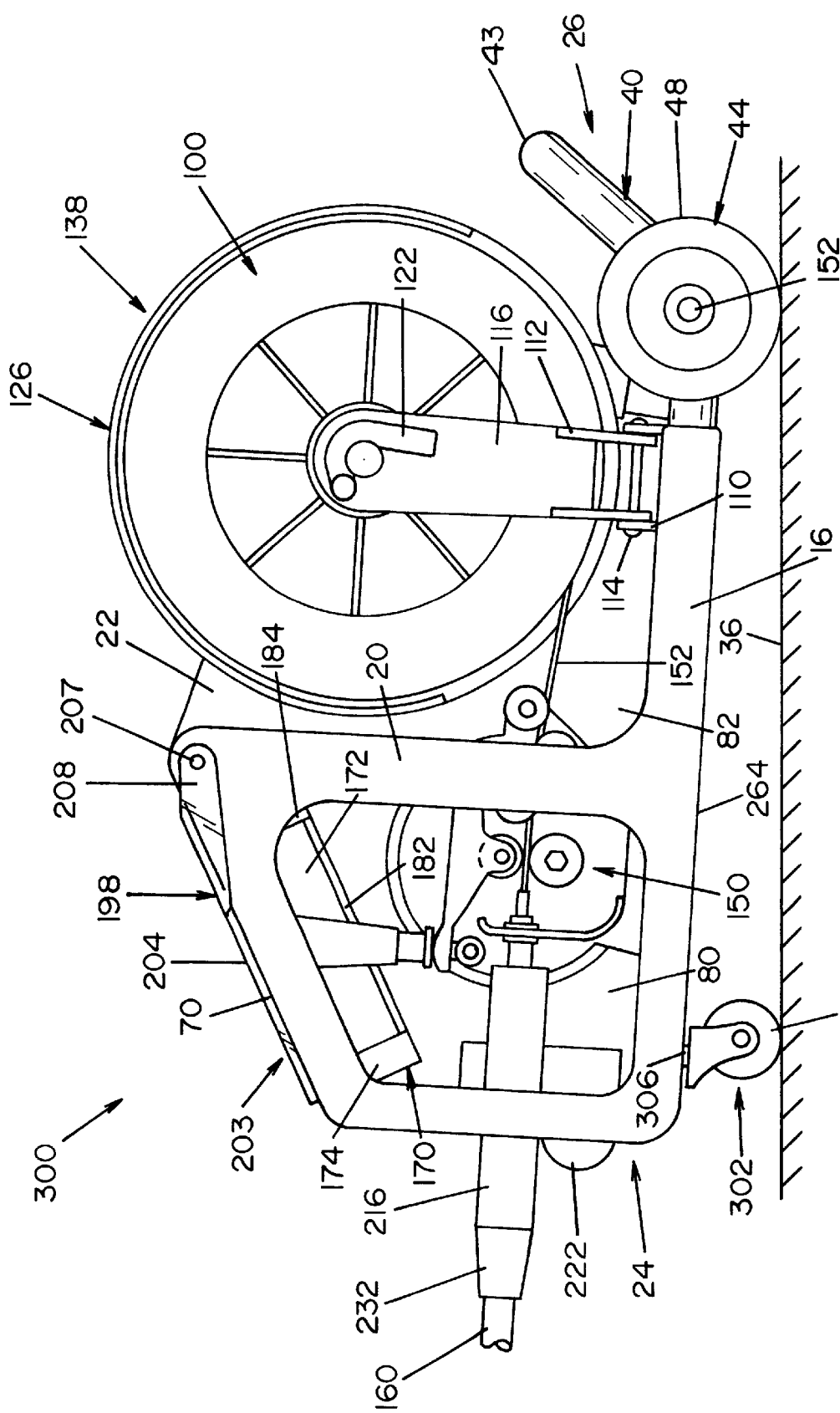
FIG. 9 is a side elevational view of one side of another embodiment of a portable wire feeder in accordance with the present invention; and, FIG. 10 is a side elevational view of one side of yet other embodiments of a portable wire feeder in accordance with the present invention.

Referring to FIG. 9, a portable wire feeder 300 is shown which includes yet a different wheel configuration which permanently engages underlying surface 36. In this respect, as will be appreciated from the showing of feeder 10 in FIGS. 4 and 5, feeder 300 includes wheels 44 and 46 having wheel surfaces 48 and 50 respectively for engaging underlying surface 36. However, feeder 300 does not include the downwardly extending base portion 33 of feeder 10. Rather, feeder 300 includes a pair of casters 302 which are rigidly connected to frame 12 on opposite sides of the frame. Casters 302 include vertical pivot pins 306 for allowing rotation of corresponding trailing wheels 310 about a vertical axis. Since casters 302 are mounted in affixed operation position, the casters along with wheel surfaces 48 and 50 engage surface 36 and permanently set feeder 300 in a moveable condition for easy movement on flat and level underlying surfaces.

Referring to FIG. 10, even yet other embodiments are shown. First, portable wire feeder 350 includes a back member 352 having a rear handle 354. Back member 352 is tubular and is U-shaped in a single plane. In this respect, unlike member 40 of feeder 10, which extends horizontally from base 14 and includes upward bends 41 and 42, member 352 extends upwardly directly from base 14. There are no upward bends in member 352. Feeder 350 further includes axle supports 356 extending horizontally from base 14 which support a rear axle 358. Wheels 44 and 46 are rotationally secured to axle 358.

Second, feeder 350 includes an additional spool support 360 which extends vertically between base 14 and spindle 92. Spool support 360 further strengthens frame 12 to better support wire spool 100.

Third, feeder 350 comprises a control box holder 370 which selectively retains a pendant control box 372. Box 372 is substantially similar to box 172 and, therefore, will not be discussed in detail. However, a bottom 374 of box 372 includes a plurality of locking tabs 376 having heads 378 and shanks 380. Holder 372 includes a base plate 382 having a mating set of tab slots 384 shaped and positioned to receive tabs 376. In this respect, slots 384 have head receiving portions 386 which are large enough to allow the respective heads 378 to penetrate base plate 382. Slots 384 further include a narrow portion 388 which are sized to only allow penetration by shanks 380. As a result, as tabs 376 enter narrow portions 388, heads 378 prevent box 372 from being pulled outwardly from plate 382. In order to remove box 372 from feeder 350, it must first be moved upwardly and then outwardly relative to plate 382.

While considerable emphasis has been placed on the preferred embodiments of the invention illustrated and described herein, it will be appreciated that other embodiments can be made and that many changes can be made in the preferred embodiments without departing from the principles of the invention. Accordingly, it is to be distinctly understood that the foregoing descriptive matter is to be interpreted merely as illustrative of the invention and not as a limitation.

Having thus described the invention, it is claimed:

1. A portable wire feeder for supplying consumable welding wire on a wire spool to a welding gun, said wire feeder comprising: a frame having a base extending in a longitudinal direction between a forward end and a rearward end, spool support means on said frame near said rearward end for supporting a wire spool for rotation relative to said frame about a spool axis; a wire advancing mechanism mounted on said frame between said forward end and said spool axis for paying wire from a spool on said support means, said mechanism including an inlet for receiving wire from a wire spool and an outlet for directing wire toward the welding gun; a control box on said frame near said forward end for controlling said advancing mechanism; a first handle between said rearward end and said spool axis, and a second handle between said forward end and said spool axis.

2. The portable wire feeder as claimed in claim 1, wherein said base has side rails which extend in said longitudinal direction between said forward and rearward ends, said side rails being transversely spaced such that said base has a front width near said forward end and a rear width near said rearward end, said rear width being greater than said front width.

3. The portable wire feeder as claimed in claim 2, wherein said frame further includes sides extending upwardly from said side rails and toward one another.

4. The portable wire feeder as claimed in claim 1, wherein said frame has sides connected to and extending upwardly from said base, said sides extending inwardly toward one another.

5. The portable wire feeder as claimed in claim 1, wherein said spool support means includes a spindle for receiving a wire spool, said spindle having a first end connected to said frame and a second end including a first latch component, said support means further including a locking arm having a first end pivotally connected to said frame and a second end having a second latch component, said arm being pivotal between an opened condition for allowing installation and removal of a spool relative to said spindle and a latched condition, said second latch component in said latched condition interengaging with said first latch component such that said locking arm supports said second end of said spindle.

6. The portable wire feeder as claimed in claim 1, wherein said frame further includes an elongated back member joined to said base at said rearward end, said back member extending upwardly and including said first handle.

7. The portable wire feeder as claimed in claim 6, wherein said base includes transversely spaced side rails which extend in said longitudinal direction between said forward and rearward ends, said back member being a tubular member and extending between said side rails.

8. The portable wire feeder as claimed in claim 6, wherein said frame further includes sides connected to said base and extending upwardly and toward one another, said second handle extending between said sides and being above said control box.

9. The portable wire feeder as claimed in claim 1, wherein said base has a bottom for engaging an underlying surface, said frame further including a back member means joined to said base at said rearward end and extending upwardly and rearwardly from said rearward end, a pair of wheels on said back member means for rotation about wheel axes and having respective rolling surfaces for engaging the underlying surface, said wheel axes being spaced above said bottom such that said rolling surfaces are spaced from the underlying surface when said bottom is resting on the underlying surface, and said rolling surfaces engaging the underlying surface when said forward end is moved upwardly relative to said rearward end.

10. The portable wire feeder as claimed in claim 9, further including at least one caster connected to said base near said forward end.

11. The portable wire feeder as claimed in claim 10, wherein said at least one caster is pivotable about a caster axis between an operating position and a retracted position.

12. The portable wire feeder as claimed in claim 11, wherein said back member means is an elongated back member joined to said side rails, said back member extending upwardly and rearwardly and including said first handle.

13. The portable wire feeder as claimed in claim 11, wherein said base has side rails which extend in said longitudinal direction between said forward and rearward ends and said bottom is a portion of said base rails.

14. The portable wire feeder as claimed in claim 1, wherein said base has a bottom for engaging an underlying surface and said frame further includes a back member means joined to said base at said rearward end, a pair of wheels on said back member means for rotation about wheel axes and having respective rolling surfaces for engaging the underlying surface, said rolling surfaces and said bottom supporting said wire feeder on the underlying surface, and when said forward end is moved upwardly relative to said rearward end, said rolling surfaces engaging the underlying surface and said bottom being spaced from the underlying surface.

15. The portable wire feeder as claimed in claim 14, wherein said base has side rails which extend in said longitudinal direction between said forward and rearward ends and said bottom is below said rails and near said forward end.

16. The portable wire feeder as claimed in claim 1, wherein said frame further includes a back member means joined to said base at said rearward end, a pair of wheels on said back member means for rotation about wheel axes and having respective rolling surfaces for engaging an underlying surface, and at least one caster connected to said base near said forward end, said rolling surfaces and said casters supporting said wire feeder on the underlying surface.

17. The portable wire feeder as claimed in claim 1, further including a cover for selectively covering said control box, said cover being pivotal relative to said frame about a cover axis between a closed position and an open position, said cover including a cover plate and an edge facing said pivot axis, said pivot edge being substantially parallel to said cover axis and spaced from said second handle in both said open and closed positions.

18. The portable wire feeder as claimed in claim 17, wherein at least a portion of said cover plate is transparent.

19. The portable wire feeder as claimed in claim 17, wherein said frame further includes sides connected to said base and extending upwardly, said second handle extending between said sides and being above said control box, and said cover axis extending through said second handle.

20. The portable wire feeder as claimed in claim 19, wherein said frame further includes an elongated back member joined to said base at said rearward end, said back member extending upwardly and including said first handle.

21. The portable wire feeder as claimed in claim 20, wherein said back member is tubular.

22. The portable wire feeder as claimed in claim 1, further including a spool cover for selectively covering the wire spool, said spool cover being operable between an opened and a closed position, at least a portion of said spool cover being transparent.

23. The portable wire feeder as claimed in claim 1, wherein said base has a first and a second side rail which extend in said longitudinal direction between said forward and rearward ends, said first and second side rails being transversely spaced, said frame further including a first and a second side extending upwardly from said first and second side rails, respectively, said first side rail and said first side being a unified component and said second side rail and said second side being a unified component.

24. A portable wire feeder for supplying consumable welding wire on a wire spool to a welding gun, said wire feeder comprising: a frame having a base extending in a longitudinal direction between a forward end and a rearward end, spool support means on said frame near said rearward end for supporting a wire spool for rotation relative to said frame about a spool axis; a wire advancing mechanism mounted on said frame between said forward end and said spool axis for paying wire from a spool on said support means, said mechanism including an inlet for receiving wire from a wire spool and an outlet for directing wire toward the welding gun; a control box on said frame near said forward end for controlling said advancing mechanism; said base having a front width near said forward end and a rear width near said rearward end, said rear width being greater than said front width; and said spool support means includes a spindle for receiving a wire spool, said spindle having a first end connected to said frame and a second end including a first latch component, said support means further including a locking arm having a first end pivotally connected to said frame and a second end having a second latch component, said arm being pivotal between an opened condition for allowing installation and removal of a spool relative to said spindle and a latched condition, said second latch component in said latched condition interengaging with said first latch component such that said locking arm supports said second end of said spindle.

25. A portable wire feeder for supplying consumable welding wire on a wire spool to a welding gun, said wire feeder comprising: a frame having a base extending in a longitudinal direction between a forward end and a rearward end, spool support means on said frame near said rearward end for supporting a wire spool for rotation relative to said frame about a spool axis; a wire advancing mechanism mounted on said frame between said forward end and said spool axis for paying wire from a spool or said support means, said mechanism including an inlet for receiving wire from a wire spool and an outlet for directing wire toward the welding gun; a control box on said frame near said forward end for controlling said advancing mechanism; said base having a front width near said forward end and a rear width near said rearward end, said rear width being greater than said front width; and said frame has sides extending upwardly from said base, said sides extending upwardly and toward one another.

26. A portable wire feeder for supplying consumable welding wire on a wire spool to a welding gun, said wire feeder comprising: a frame having a base extending in a longitudinal direction between a forward end and a rearward end, spool support means on said frame near said rearward end for supporting a wire spool for rotation relative to said frame about a spool axis a wire advancing mechanism mounted on said frame between said forward end and said spool axis for paying wire from a spool on said support means, said mechanism including an inlet for receiving wire from a wire spool and an outlet for directing wire toward the welding gun; a control box on said frame near said forward end for controlling said advancing mechanism; said base having a front width near said forward end and a rear width near said rearward end, said rear width being greater than said front width; and said base includes transversely spaced side rails extending in said longitudinal direction between said forward and rearward ends and an elongated back member connected to said side rails, said back member including a handle.

27. The portable wire feeder as claimed in claim 26, wherein said frame further includes sides respectively connected to said side rails, said sides having access openings and extending upwardly from said side rails and toward one another, and said portable wire feeder further including a second handle joining said sides.

28. A portable wire feeder for supplying consumable welding wire on a wire spool to a welding gun, said wire feeder comprising: a frame having a base extending in a longitudinal direction between a forward end and a rearward end, spool support means on said frame near said rearward end for supporting a wire spool for rotation relative to said frame about a spool axis; a wire advancing mechanism mounted on said frame between said forward end and said spool axis for paying wire from a spool on said support means, said mechanism including an inlet for receiving wire from a wire spool and an outlet for directing wire toward the welding gun; a control box on said frame near said forward end for controlling said advancing mechanism; said base having a front width near said forward end and a rear width near said rearward end, said rear width being greater than said front width; said wire feeder further including a cover for selectively covering said control box, said cover being pivotal relative to said frame about a cover axis between a closed position and an open position, said cover including a cover plate and an edge facing said pivot axis, at least a portion of said cover plate being transparent.

29. A portable wire feeder for supplying consumable welding wire on a wire spool to a welding gun, said wire feeder comprising: a frame having a base extending in a longitudinal direction between a forward end and a rearward end, spool support means on said frame near said rearward end for supporting a wire spool for rotation relative to said frame about a horizontal spool axis transverse to said longitudinal direction; a wire advancing mechanism mounted on said frame between said forward end and said spool axis for paying wire from a spool on said support means, said mechanism including an inlet for receiving wire from a wire spool and an outlet for directing wire toward the welding gun; a control box on said frame near said forward end for controlling said advancing mechanism; said base having a front width near said forward end and a rear width near said rearward end, said rear width being greater than said front width.

30. The portable wire feeder as claimed in claim 24, wherein said base has a bottom for engaging an underlying surface, said frame further including a back member means joined to said base at said rearward end and extending upwardly and rearwardly from said rearward end, a pair of wheels on said back member means for rotation about wheel axes and having respective rolling surfaces for engaging the underlying surface, said wheel axes being spaced above said bottom such that said rolling surfaces are spaced from the underlying surface when said bottom is resting on the underlying surface, and said rolling surfaces engaging the underlying surface when said forward end is moved upwardly relative to said rearward end.

31. The portable wire feeder as claimed in claim 30, further including at least one caster connected to said base near said forward end.

32. The portable wire feeder as claimed in claim 31, wherein said at least one caster is pivotable about a caster axis between an operating position and a retracted position.

33. The portable wire feeder as claimed in claim 32, wherein said back member means is an elongated back member joined to said side rails, said back member extending upwardly and rearwardly and including a first handle.

34. The portable wire feeder as claimed in claim 32, wherein said base has side rails which extend in said longitudinal direction between said forward and rearward ends and said bottom is a portion of said base rails.

35. The portable wire feeder as claimed in claim 29, wherein said frame further includes a back member means joined to said base at said rearward end, a pair of wheels on said back member means for rotation about wheel axes and having respective rolling surfaces for engaging an underlying surface, and at least one caster connected to said base near said forward end, said rolling surfaces and said casters supporting said wire feeder on the underlying surface.

36. The portable wire feeder as claimed in claim 29, wherein said base has a first and a second side rail which extend in said longitudinal direction between said forward and rearward ends, said first and second side rails being transversely spaced, said frame further including a first and a second side extending upwardly from said first and second side rails respectively, said first side rail and said first side being a unified component and said second side rail and said second side being a unified component.

37. A portable wire feeder for supplying consumable welding wire on a wire spool to a welding gun, said wire feeder comprising: a frame having a base extending in a longitudinal direction between a forward end and a rearward end, spool support means on said frame near said rearward end for supporting a wire spool for rotation relative to said frame about a spool axis; a wire advancing mechanism mounted on said frame between said forward end and said spool axis for paying wire from a spool on said support means, said mechanism including an inlet for receiving wire from a wire spool and an outlet for directing wire toward the welding gun; a control box on said frame near said forward end for controlling said advancing mechanism; said base having a front width near said forward end and a rear width near said rearward end, said rear width being greater than said front width; and said base has a bottom for engaging an underlying surface and said frame further includes a back member means joined to said base at said rearward end, a pair of wheels on said back member means for rotation about wheel axes and having respective rolling surfaces for engaging the underlying surface, said rolling surfaces and said bottom supporting said wire feeder on the underlying surface, and when said forward end is moved upwardly relative to said rearward end, said rolling surfaces engaging the underlying surface and said bottom being spaced from the underlying surface.

38. The portable wire feeder as claimed in claim 37, wherein said base has side rails which extend in said longitudinal direction between said forward and rearward ends and said bottom is below said rails and near said forward end.

39. A portable wire feeder for supplying consumable welding wire on a wire spool to a welding gun, said wire feeder comprising: a frame having a base extending in a longitudinal direction between a forward end and a rearward end, spool support means on said frame near said rearward end for supporting a wire spool for rotation relative to said frame about a spool axis, said spool support means including a spindle for receiving a wire spool, said spindle having a first end connected to said frame and a second end including a first latch component, said support means further including a locking arm having a first end pivotally connected to said frame and a second end having a second latch component, said arm being pivotal between an opened condition for allowing installation and removal of a spool relative to said spindle and a latched condition, said second latch component in said latched condition interengaging with said first latch component such that said locking arm supports said second end of said spindle; a wire advancing mechanism mounted on said frame between said forward end and said spool axis for paying wire from a spool on said support means, said mechanism including an inlet for receiving wire from a wire spool and an outlet for directing wire toward the welding gun; and a control box on said frame near said forward end for controlling said advancing mechanism.

40. The portable wire feeder as claimed in claim 39, wherein said base has side rails which extend in said longitudinal direction between said forward and rearward ends, said side rails being transversely spaced such that said base has a front width near said forward end and a rear width near said rearward end, said rear width being greater than said front width.

41. The portable wire feeder as claimed in claim 40, wherein said frame further includes sides extending upwardly from said side rails and toward one another.

42. The portable wire feeder as claimed in claim 41, wherein said spindle is connected to one of said sides and the other of said sides includes a spool removing opening.

43. The portable wire feeder as claimed in claim 39, wherein said base has a bottom for engaging an underlying surface, said frame further including a back member means joined to said base at said rearward end and extending upwardly and rearwardly from said rearward end, a pair of wheels on said back member means for rotation about wheel axes and having respective rolling surfaces for engaging the underlying surface, said wheel axes being spaced above said bottom such that said rolling surfaces are spaced from the underlying surface when said bottom is resting on the underlying surface, and said rolling surfaces engaging the underlying surface when said forward end is moved upwardly relative to said rearward end.

44. The portable wire feeder as claimed in claim 43, further including at least one caster connected to said base near said forward end.

45. The portable wire feeder as claimed in claim 44, wherein said at least one caster is pivotable about a caster axis between an operating position and a retracted position.

46. The portable wire feeder as claimed in claim 45, wherein said back member means is an elongated back member joined to said side rails, said back member extending upwardly and rearwardly and including a first handle.

47. The portable wire feeder as claimed in claim 45, wherein said base has side rails which extend in said longitudinal direction between said forward and rearward ends and said bottom is a portion of said base rails.

48. The portable wire feeder as claimed in claim 39, wherein said base has a bottom for engaging an underlying surface and said frame further includes a back member means joined to said base at said rearward end, a pair of wheels on said back member means for rotation about wheel axes and having respective rolling surfaces for engaging the underlying surface, said rolling surfaces and said bottom supporting said wire feeder on the underlying surface, and when said forward end is moved upwardly relative to said rearward end, said rolling surfaces engaging the underlying surface and said bottom being spaced from the underlying surface.

49. The portable wire feeder as claimed in claim 48, wherein said base has side rails which extend in said longitudinal direction between said forward and rearward ends and said bottom is below said rails and near said forward end.

50. The portable wire feeder as claimed in claim 39, wherein said frame further includes a back member means joined to said base at said rearward end, a pair of wheels on said back member means for rotation about wheel axes and having respective rolling surfaces for engaging an underlying surface, and at least one caster connected to said base near said forward end, said rolling surfaces and said casters supporting said wire feeder on the underlying surface.

51. The portable wire feeder as claimed in claim 39, further including a cover for selectively covering said control box, said cover being pivotal relative to said frame about a cover axis between a closed position and an open position, said cover including a cover plate and an edge facing said pivot axis, said pivot edge being substantially parallel to said cover axis and spaced from said second handle in both said open and closed positions.

52. The portable wire feeder as claimed in claim 51, wherein at least a portion of said cover plate is transparent.

53. The portable wire feeder as claimed in claim 51, wherein said frame includes sides extending upwardly from said base, said wire feeder further including a handle extending between said sides and above said control box, said cover axis extending through said handle and said edge being spaced from the outer surface of said handle such that an operator's hand can grip said handle while said cover is in either said closed position or said open position.

54. A portable wire feeder for supplying consumable welding wire on a wire spool to a welding gun, said wire feeder comprising: a frame having a base extending in a longitudinal direction between a forward end and a rearward end, back member means joined to said base at said rearward end, spool support means on said frame near said rearward end for supporting a wire spool for rotation relative to said frame about a spool axis; a wire advancing mechanism mounted on said frame between said forward end and said spool axis for paying wire from a spool on said support means, said mechanism including an inlet for receiving wire from a wire spool and an outlet for directing wire toward the welding gun; a control box on said frame near said forward end for controlling said advancing mechanism; a pair of wheels on said back member means for rotation about wheel axes and having respective rolling surfaces for engaging an underlying surface; and said base has a bottom for engaging the underlying surface, said wheel rolling surfaces and said bottom supporting said wire feeder on the underlying surface, and when said forward end is moved upwardly relative to said rearward end, said rolling surfaces engaging the underlying surface and said bottom being spaced from the underlying surface.

55. The portable wire feeder as claimed in claim 54, wherein said base has side rails which extend in said longitudinal direction between said forward and rearward ends and said bottom is below said rails and near said forward end.

56. A portable wire feeder for supplying consumable welding wire on a wire spool to a welding gun, said wire feeder comprising: a frame having a base extending in a longitudinal direction between a forward end and a rearward end, back member means joined to said base at said rearward end, spool support means on said frame near said rearward end for supporting a wire spool for rotation relative to said frame about a spool axis; a wire advancing mechanism mounted on said frame between said forward end and said spool axis for paying wire from a spool on said support means, said mechanism including an inlet for receiving wire from a wire spool and an outlet for directing wire toward the welding gun; a control box on said frame near said forward end for controlling said advancing mechanism; a pair of wheels on said back member means for rotation about wheel axes and having respective rolling surfaces for engaging an underlying surface; and said spool support means includes a spindle for receiving a wire spool, said spindle having a first end connected to said frame and a second end including a first latch component, said support means further including a locking arm having a first end pivotally connected to said frame and a second end having a second latch component, said arm being pivotal between an opened condition for allowing installation and removal of a spool relative to said spindle and a latched condition, said second latch component in said latched condition interengaging with said first latch component such that said locking arm supports said second end of said spindle.

57. A portable wire feeder for supplying consumable welding wire on a wire spool to a welding gun, said wire feeder comprising: a frame having a base extending in a longitudinal direction between a forward end and a rearward end, back member means joined to said base at said rearward end, spool support means on said frame near said rearward end for supporting a wire spool for rotation relative to said frame about a spool axis; a wire advancing mechanism mounted on said frame between said forward end and said spool axis for paying wire from a spool on said support means, said mechanism including an inlet for receiving wire from a wire spool and an outlet for directing wire toward the welding gun; a control box on said frame near said forward end for controlling said advancing mechanism; a pair of wheels on said back member means for rotation about wheel axes and having respective rolling surfaces for engaging an underlying surface; said base has side rails which extend in said longitudinal direction between said forward and rearward ends, said side rails being transversely spaced such that said base has a front width near said forward end and a rear width near said rearward end, said rear width being greater than said front width; and said frame further includes sides extending upwardly from said side rails and toward one another.

58. The portable wire feeder as claimed in claim 57, wherein said frame has sides connected to and extending upwardly from said base, said sides extending upwardly toward one another.

59. A portable wire feeder for supplying consumable welding wire on a wire spool to a welding gun, said wire feeder comprising: a frame having a base extending in a longitudinal direction between a forward end and a rearward end, spool support means on said frame near said rearward end for supporting a wire spool for rotation relative to said frame about a spool axis; a wire advancing mechanism mounted on said frame between said forward end and said spool axis for paying wire from a spool on said support means, said mechanism including an inlet for receiving wire from a wire spool and an outlet for directing wire toward the welding gun; a control box on said frame near said forward end for controlling said advancing mechanism; a handle spaced from said control box; and a cover for selectively covering said control box, said cover being pivotal relative to said frame about a cover axis between a closed position and an open position, said cover including a cover plate and an edge facing said pivot axis, said edge being substantially parallel to said cover axis and spaced from said handle in both said open and closed positions.

60. The portable wire feeder as claimed in claim 59, wherein said cover axis extends through said handle and said edge is spaced from the outer surface of said handle such that an operator's hand can grip said handle while said cover is in either said closed or said open position.

61. The portable wire feeder as claimed in claim 60, wherein said handle is a first handle and said wire feeder further includes a second handle.

62. The portable wire feeder as claimed in claim 59, wherein said base has side rails which extend in said longitudinal direction between said forward and rearward ends, said side rails being transversely spaced such that said base has a front width near said forward end and a rear width near said rearward end, said rear width being greater than said front width.

63. The portable wire feeder as claimed in claim 62, wherein said frame further includes sides extending upwardly from said side rails and toward one another.

64. The portable wire feeder as claimed in claim 59, wherein said frame has sides connected to and extending upwardly from said base, said sides extending upwardly toward one another.

65. The portable wire feeder as claimed in claim 59, wherein said spool support means includes a spindle for receiving a wire spool, said spindle having a first end connected to said frame and a second end including a first latch component, said support means further including a locking arm having a first end pivotally connected to said frame and a second end having a second latch component, said arm being pivotal between an opened condition for allowing installation and removal of a spool relative to said spindle and a latched condition, said second latch component in said latched condition interengaging with said first latch component such that said locking arm supports said second end of said spindle.

66. The portable wire feeder as claimed in claim 59, wherein said frame further includes sides connected to said base which extend upwardly and toward one another, said handle extending between said sides.

67. The portable wire feeder as claimed in claim 59, wherein said base has a bottom for engaging an underlying surface, said frame further including a back member means joined to said base at said rearward end and extending upwardly and rearwardly from said rearward end, a pair of wheels on said back member means for rotation about wheel axes and having respective rolling surfaces for engaging the underlying surface, said wheel axes being spaced above said bottom such that said rolling surfaces are spaced from the underlying surface when said bottom is resting on the underlying surface, and said rolling surfaces engaging the underlying surface when said forward end is moved upwardly relative to said rearward end.

68. The portable wire feeder as claimed in claim 67, further including at least one caster connected to said base near said forward end.

69. The portable wire feeder as claimed in claim 68, wherein said at least one caster is pivotable about a caster axis between an operating position and a retracted position.

70. The portable wire feeder as claimed in claim 69, wherein said back member means is an elongated back member joined to said side rails, said back member extending upwardly and rearwardly and including said first handle.

71. The portable wire feeder as claimed in claim 69, wherein said base has side rails which extend in said longitudinal direction between said forward and rearward ends and said bottom is a portion of said base rails.

72. The portable wire feeder as claimed in claim 59, wherein said base has a bottom for engaging an underlying surface and said frame further includes a back member means joined to said base at said rearward end, a pair of wheels on said back member means for rotation about wheel axes and having respective rolling surfaces for engaging the underlying surface, said rolling surfaces and said bottom supporting said wire feeder on the underlying surface, and when said forward end is moved upwardly relative to said rearward end, said rolling surfaces engaging the underlying surface and said bottom being spaced from the underlying surface.

73. The portable wire feeder as claimed in claim 72, wherein said base has side rails which extend in said longitudinal direction between said forward and rearward ends and said bottom is below said rails and near said forward end.

74. The portable wire feeder as claimed in claim 59, wherein said frame further includes a back member means joined to said base at said rearward end, a pair of wheels on said back member means for rotation about wheel axes and having respective rolling surfaces for engaging an underlying surface, and at least one caster connected to said base near said forward end, said rolling surfaces and said casters supporting said wire feeder on the underlying surface.

75. The portable wire feeder as claimed in claim 74, further including at least one caster connected to said base near said forward end and pivotal about a caster axis between an operating position and a retracted position, said at least one caster in said retracted position being spaced from the underlying surface when said bottom is resting on the underlying surface, and said at least one caster in said operating position engaging the underlying surface to raise said forward end for said rolling surfaces of said wheels to engage the underlying surface.

76. The portable wire feeder as claimed in claim 59, wherein at least a portion of said cover plate is transparent.

77. The portable wire feeder as claimed in claim 59, further including a spool cover for selectively covering the wire spool, said spool cover being operable between an opened and a closed position, at least a portion of said spool cover being transparent.

* * * * *